US007581307B2

(12) United States Patent
Stewart et al.

(10) Patent No.: US 7,581,307 B2
(45) Date of Patent: Sep. 1, 2009

(54) METHOD OF MAKING AN ELECTRIC MACHINE HAVING AN ELECTRONICS MOUNT SECURED BY AN INTERFERENCE FIT

(75) Inventors: William P. Stewart, Saint Peters, MO (US); Donald J. Williams, Pierron, IL (US)

(73) Assignee: Emerson Electric Co., St. Louis, MO (US)

( * ) Notice: Subject to any disclaimer, the term of this patent is extended or adjusted under 35 U.S.C. 154(b) by 300 days.

(21) Appl. No.: 11/208,687

(22) Filed: Aug. 22, 2005

(65) Prior Publication Data

US 2006/0070229 A1     Apr. 6, 2006

Related U.S. Application Data

(62) Division of application No. 10/958,214, filed on Oct. 4, 2004, now abandoned.

(51) Int. Cl.
*H02K 15/02* (2006.01)
*H02K 15/06* (2006.01)
(52) U.S. Cl. .............................. 29/596; 29/597; 29/598; 29/732; 29/447; 29/898.07; 310/254
(58) Field of Classification Search ........... 29/596–598, 29/732–736, 477; 310/254–258, 42, 64, 310/89, 67 R
See application file for complete search history.

(56) References Cited

U.S. PATENT DOCUMENTS

| 529,437 | A | 11/1894 | Wood |
| 2,072,769 | A | 3/1937 | Reeder |
| 2,479,330 | A | 8/1949 | Fagley |
| 3,050,832 | A | 8/1962 | Scheldorf |
| 3,492,517 | A | * | 1/1970 | Kuraisi ........................ 310/89 |
| 3,531,702 | A | * | 9/1970 | Hill ............................ 318/138 |

(Continued)

FOREIGN PATENT DOCUMENTS

DE     199 35 723 A1     10/2000

(Continued)

OTHER PUBLICATIONS

Design of a High Speed Switched Reluctance Machine for Automotive Turbo-Generator Applications; S.D. Calverly, et al; University of Sheffield; SAE Technical Paper Series 1999-01-2933; Aug. 17-19, 1999, pp. 1-10.

(Continued)

*Primary Examiner*—Minh Trinh
(74) *Attorney, Agent, or Firm*—Harness, Dickey & Pierce, P.L.C.

(57) ABSTRACT

A method includes heating a housing of an electric machine to thermally expand the housing, positioning a mount having power and control electronics assembled thereon and in contact therewith in the housing and against an internal stop defined within the housing, and allowing the housing to cool and thermally contract against the mount thereby forming an interference fit between the housing and the mount. The interference fit secures the mount within the housing. The mount and the housing have coefficients of thermal expansion such that the interference fit is maintained across an operating temperature range of the machine. The electric machine may also include a segmented or non-segmented stator within the housing.

6 Claims, 6 Drawing Sheets

U.S. PATENT DOCUMENTS

| | | | |
|---|---|---|---|
| 3,845,334 A | 10/1974 | Harada et al. | |
| 3,946,260 A | 3/1976 | Frezzolini et al. | |
| 3,990,141 A * | 11/1976 | Stark | 29/596 |
| 4,253,031 A | 2/1981 | Frister | |
| 4,603,273 A * | 7/1986 | McDonald | 310/89 |
| 4,617,726 A | 10/1986 | Denk | |
| 4,758,755 A | 7/1988 | Sherman et al. | |
| 4,801,831 A | 1/1989 | Lewis | |
| 4,850,193 A | 7/1989 | Kawamura | |
| 4,888,510 A * | 12/1989 | Hunt | 310/54 |
| 4,908,922 A | 3/1990 | Abe | |
| 4,982,125 A * | 1/1991 | Shirakawa | 310/88 |
| 5,006,744 A | 4/1991 | Archer et al. | |
| 5,059,042 A | 10/1991 | Grierson | |
| 5,128,576 A | 7/1992 | Obradovic | |
| 5,199,171 A | 4/1993 | Umezawa et al. | |
| 5,264,748 A * | 11/1993 | Ootsuka et al. | 310/90 |
| 5,638,796 A | 6/1997 | Adams, III et al. | |
| 5,926,663 A | 7/1999 | Suzuki | |
| 5,973,428 A | 10/1999 | Zakrocki et al. | |
| 6,065,760 A | 5/2000 | Weygandt | |
| 6,145,314 A | 11/2000 | Wollenweber et al. | |
| 6,173,996 B1 * | 1/2001 | Derakhshan et al. | 285/114 |
| 6,212,753 B1 * | 4/2001 | Derakhshan et al. | 29/447 |
| 6,271,609 B1 * | 8/2001 | Hollenbeck et al. | 310/71 |
| 6,400,059 B1 | 6/2002 | Hsu | |
| 6,404,095 B1 | 6/2002 | Hsu | |
| 6,448,686 B1 | 9/2002 | Dawson et al. | |
| 6,487,769 B2 * | 12/2002 | Ketterer et al. | 29/596 |
| 6,515,397 B1 | 2/2003 | Schmid | |
| 6,572,283 B1 | 6/2003 | Imano | |
| 6,583,530 B2 | 6/2003 | Hsu | |
| 6,651,633 B1 | 11/2003 | Jones | |
| 6,713,916 B1 | 3/2004 | Williams et al. | |
| 6,848,165 B1 | 2/2005 | Furuse | |
| 6,941,644 B2 | 9/2005 | Shteynberg et al. | |
| D515,521 S | 2/2006 | Stewart et al. | |
| 7,036,206 B2 | 5/2006 | Worden et al. | |
| 7,105,976 B2 * | 9/2006 | Stewart et al. | 310/218 |
| 2002/0011755 A1 | 1/2002 | Shteynberg et al. | |
| 2003/0067243 A1 | 4/2003 | Hollenbeck et al. | |
| 2004/0183388 A1 | 9/2004 | Rittmeyer | |
| 2006/0070228 A1 * | 4/2006 | Stewart et al. | 29/596 |
| 2006/0071564 A1 | 4/2006 | Stewart | |
| 2006/0071569 A1 | 4/2006 | Stewart et al. | |
| 2006/0071574 A1 | 4/2006 | Stewart | |
| 2006/0073042 A1 | 4/2006 | Stewart et al. | |

FOREIGN PATENT DOCUMENTS

| | | |
|---|---|---|
| EP | 1 367 699 A | 12/2003 |
| WO | WO 99/33158 A | 7/1999 |
| WO | WO 03/021746 | 3/2003 |
| WO | WO 03/096515 | 11/2003 |
| WO | WO 2004/004098 | 1/2004 |
| WO | WO 2005/085611 | 9/2005 |

OTHER PUBLICATIONS

Visteon Partners in Technology; European Automotive Design; Oct. 2002; pp. 30-43.

Aerodynamic Losses in Switched Reluctance Machines; S.D. Calverly, et al; IEE Proc.- Electr. Power Appl., vol. 147, No. 6, Nov. 2000; pp. 443-448.

* cited by examiner

METHOD OF MAKING AN ELECTRIC MACHINE HAVING AN ELECTRONICS MOUNT SECURED BY AN INTERFERENCE FIT

CROSS REFERENCE TO RELATED APPLICATION

This is a divisional of U.S. application Ser. No. 10/958,214 filed Oct. 4, 2004, now abandoned, the entire disclosure of which is incorporated herein by reference.

FIELD

The present invention generally relates to electric machines, and more particularly (but not exclusively) to electric machines with power and control electronics integrated into the primary machine housing.

BACKGROUND

Electric machines and their power and control electronics are commonly packaged separately within different housings or enclosures. With this separate packaging, however, an interface is created between the two discrete enclosures that must normally be sealed from the outside environment in order to protect the various machine components within the enclosures.

In addition, many applications require cooling features for each of the separate housings. But the separate packaging can limit the options available for the cooling features and/or compromise the thermal efficiency of the cooling features depending on their location and orientation.

Further, separately packing the machine from its power and control electronics increases the number of component parts, mechanical fasteners, and assembly steps. This, in turn, can increase both time and costs associated with machine manufacture and assembly. For example, one process involves bolting the machine enclosure to the electronics enclosure. This bolted attachment, however, requires additional components and processes and also requires secondary features if the machine and electronics packages are to be sealed from the outside environment.

SUMMARY

In one implementation, an electric machine includes a housing, a mount within the housing, and power and control electronics coupled to the mount. An interference fit is formed between the mount and the housing that secures the mount within the housing independent of mechanical fasteners. The electric machine can also include a segmented or non-segmented stator within the housing.

In another aspect, the present invention provides a method that generally includes heating a housing of an electric machine to thermally expand the housing, positioning within the housing a mount for power and control electronics, and allowing the housing to cool and thermally contract against the mount thereby forming an interference fit between the housing and the mount. The interference fit secures the mount within the housing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Corresponding reference numerals indicate corresponding parts throughout the several views of the drawings.

DETAILED DESCRIPTION OF THE EXEMPLARY EMBODIMENTS

The following description of the exemplary embodiments is merely exemplary in nature and is in no way intended to limit the invention, its application, or uses.

An electric machine according to one aspect of the invention generally includes a housing and a mount within the housing. Power and control electronics can be coupled to the mount. An interference fit is formed between the mount and the housing that secures the mount within the housing independent of mechanical fasteners. The electric machine can also include a segmented or non-segmented stator within the housing. In yet other aspects, the invention provides housings, mounts for power and control electronics, and combinations thereof. Further aspects of the invention include electric machines, electric motors, electric superchargers, vehicles (e.g., automobiles, etc.), switched reluctance motors, brushless permanent magnet (BPM) motors, and induction motors that include housings and/or mounts for power and control electronics of the present invention.

Accordingly, various implementations of the invention enable the power and control electronics to be positioned within the same primary housing as other machine components, such as the stator, stator windings, end shield, and rotor. This, in turn, can significantly improve the manufacturability of electric machines. By eliminating the need for the separate packaging of the machine from its power and control electronics, manufacture and assembly can be streamlined with reductions in the number of discrete components, fasteners, material, and tooling.

FIGS. 1 through 5 illustrate an exemplary housing 100 and a mount 104 for power and control electronics in accordance with the principles of this invention. The housing 100 is sized to receive the mount 104 and the power and control electronics assembly 108 coupled to the mount 104. The housing 100 is also sized to receive a stator 112 (including the stator windings 116, lead and exit ends 118 from the stator windings 116, and end caps 120) and an end shield 124. Accordingly, the stator 112 and end shield 124 can be positioned within the same primary housing 100 as the mount 104 and electronics assembly 108.

Figure 1:
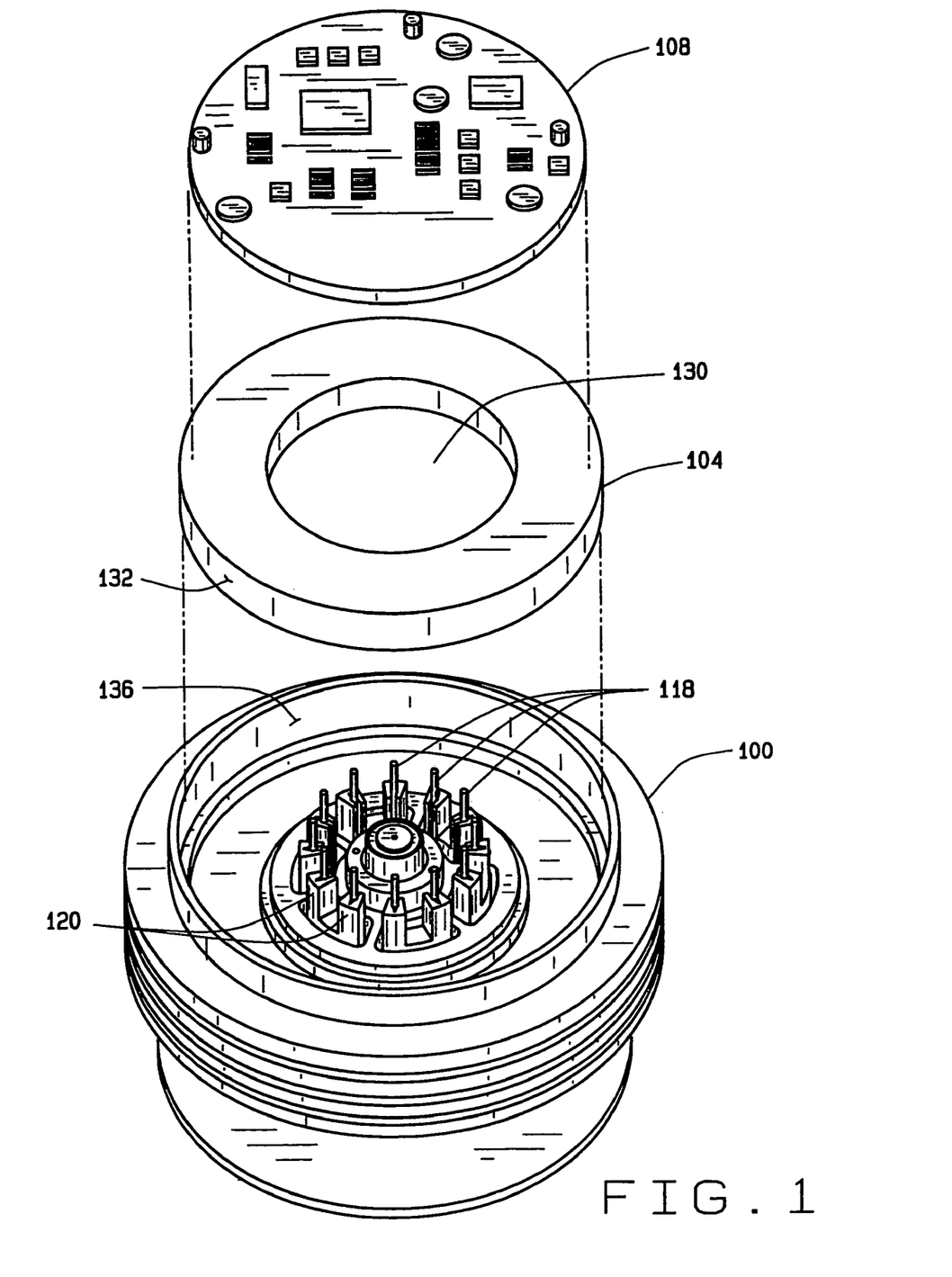
FIG. 1 is a perspective view showing an electronics mount and power and control electronics aligned for positioning within a housing according to an exemplary embodiment of the invention.
Figure 2:
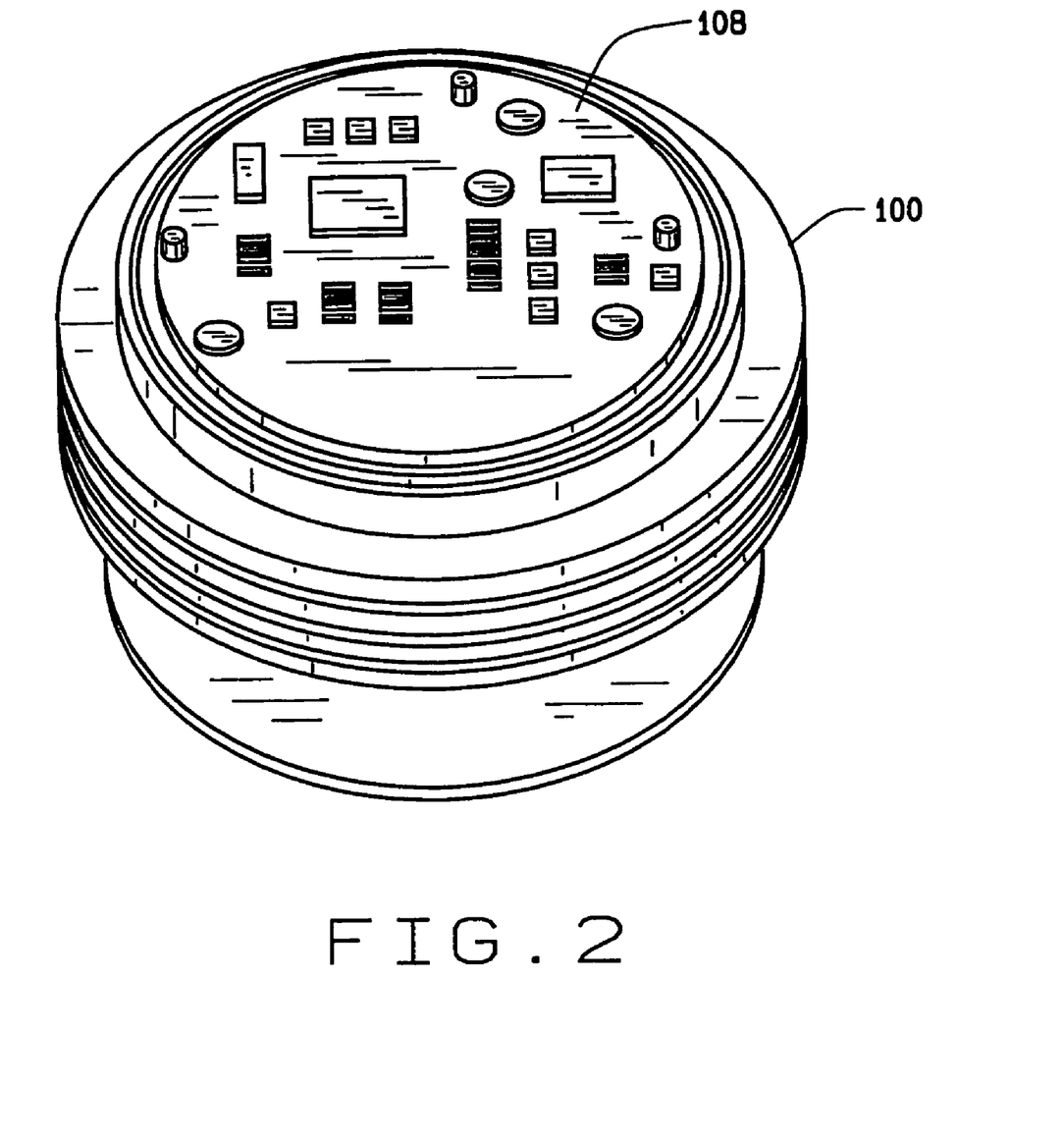
FIG. 2 is a perspective view showing the electronics mount and power and control electronics installed within the housing shown in FIG. 1.

As shown in FIG. 1, the end caps 120 can be configured so as to position and maintain the position of the lead and exit ends 118 of the stator windings 116 for connection with corresponding components of the electronics assembly 108. By way of example only, the end caps 120 may comprise an end cap as described in U.S. patent application Ser. No. 10/958,215 filed Oct. 4, 2004, entitled "Stator End Caps and Methods for Positioning the Lead and Exit Ends of the Stator Windings", the entire disclosure of which is incorporated herein by reference.

In various implementations, the housing 100 can also include mounting and locating features for the mount 104. For example, and as shown in FIGS. 1, 3, 6 and 7, the housing 100 can define an internal stop or shoulder 128 configured to contact the mount 104. While assembling the machine, the mount 104 and/or the housing 100 can be moved relatively towards one another until the mount 104 abuts against the stop 128 within the housing 100. At which point, the stop 128 inhibits continued relative movement of the mount 104 into the housing 100.

As shown in FIG. 1, the mount 104 is configured in the shape of a generally circular ring that defines a central circular opening 130 therethrough. Alternatively, other shapes can be employed for the mount depending on the particular configuration of the housing in which the mount will be positioned. For example, other embodiments can include a mount having a non-circular shape (e.g., rectangular, triangular, ovular, among others) and/or a solid or non-annular mount that does not define any openings therethough.

The mount 104 can also define one or more recesses or through-holes into which one or more electronic components (e.g., capacitors, etc.) extend. By having electronics components extend into the recesses or through-holes defined by the mount 104, the thickness of those electronics components can be accommodated without having to otherwise increase the overall length of the machine.

A wide range of electronic components can be coupled to the mount 104 using any suitable means including adhesives, clips, mechanical fasteners, among others. In various implementations, the mount 104 is positioned within the housing 100 before any electronics are coupled to the mount 104. After the mount 104 is within the housing 100, electronics assembly 108 is then positioned within the housing 100 and coupled to the mount 104. Alternative implementations, however, can include coupling electronics (e.g., as an assembly 108) to the mount 104, and then positioning the mount 104 and the electronics thereon into the housing 100.

To retain the mount 104 within the housing 100, an interference fit can be formed between a sidewall 132 of the mount 104 and a surface 136 of the housing 100. With this interference fit, the mount 104 can thus be engaged and retained within the housing 100 independent of mechanical fasteners. The interference fit can also help maintain good thermal conductivity between the housing 100 and the mount 104 (e.g., there is little to no impediment to heat transfer at the mated surfaces). Integrating the electronics into the primary machine housing 100 eliminates an interface (and consequently a potential ingress for moisture) that is usually present in existing applications between the separate housings for the electronics and the machine (e.g., stator and rotor). The single unit electronics enclosure can also work to contain electromagnetic interference (EMI) fields.

A description will now be provided of an exemplary method for forming the interference fit between the mount's sidewall 132 and the housing's surface 136. First, the housing 100 can be heated (e.g., induction heated, etc.) to thermally expand the housing 100. The mount 104 and/or housing 100 can then be moved relative to one another so as to position the mount 104 within the thermally expanded housing 100. That is, the mount 104 can be moved towards the housing 100 as the housing 100 remains stationary, or the housing 100 can be moved towards the mount 104 as the mount 104 remains stationary, or both the mount 104 and the housing 100 can be moved towards each other. In any event, the relative movement between the housing 100 and the mount 104 can continue until the mount 104 abuts against the stop 128 within the housing 100. The housing 100 is allowed to cool and thermally contract against the mount's sidewall 132, thereby forming an interference fit between the housing 100 and the mount 104. Allowing the housing 100 to cool can include either or both passively allowing the housing 100 to cool and/or actively cooling the housing 100.

Alternatively, other implementations can form the interference fit by thermally contracting the mount (e.g., by actively cooling the mount), moving the mount and/or housing relative to one another so as to position the thermally contracted mount within the housing, and then allowing the mount to thermally expand against the housing (e.g., by actively heating and/or passively allowing the mount to return to ambient temperate). In further implementations, the interference fit between the housing and the mount can be formed by using other suitable methods, such as axial press fitting and thermally conductive adhesives.

A wide range of materials can be used for the housing 100 and the mount 104. In preferred implementations, the housing 100 and the mount 104 are formed from materials such that the housing 100 and mount 104 have coefficients of thermal expansion for maintaining the interference fit therebetween across an operating temperature range of the machine. This, in turn, allows the mount 104 to be retained within the housing 100 independent of mechanical fasteners. The selection of materials for the housing 100 and mount 104 can also depend at least in part on the thermal conductivity properties of the materials being considered.

In one exemplary embodiment, the housing 100 and the mount 104 are formed from the same material, such as aluminum or an aluminum alloy, among other suitable materials. In which case, the housing 100 and mount 104 can have about equal coefficients of thermal expansion and thus thermally expand at about the same rate. Alternatively, the housing 100 and mount 104 can be formed from different materials yet still have coefficients of thermal expansion for maintaining the interference fit across an operating temperature range of the machine.

Various implementations can also include thermal management features incorporated into the machine. For example, the housing 100 and the mount 104 can all be formed from materials having good thermal conductivity properties. In addition to material selection, the interference fit between the housing 100 and the mount 104 can also help maintain good thermal conductivity between the housing 100 and the mount 104. Accordingly, these features can allow heat to be relatively efficiently transferred from the mount 104 to the housing 100 and/or to allow the mount 104 to operate as a heat sink for the electronics assembly 108, such as the power electronics of the assembly 108.

Figure 3:
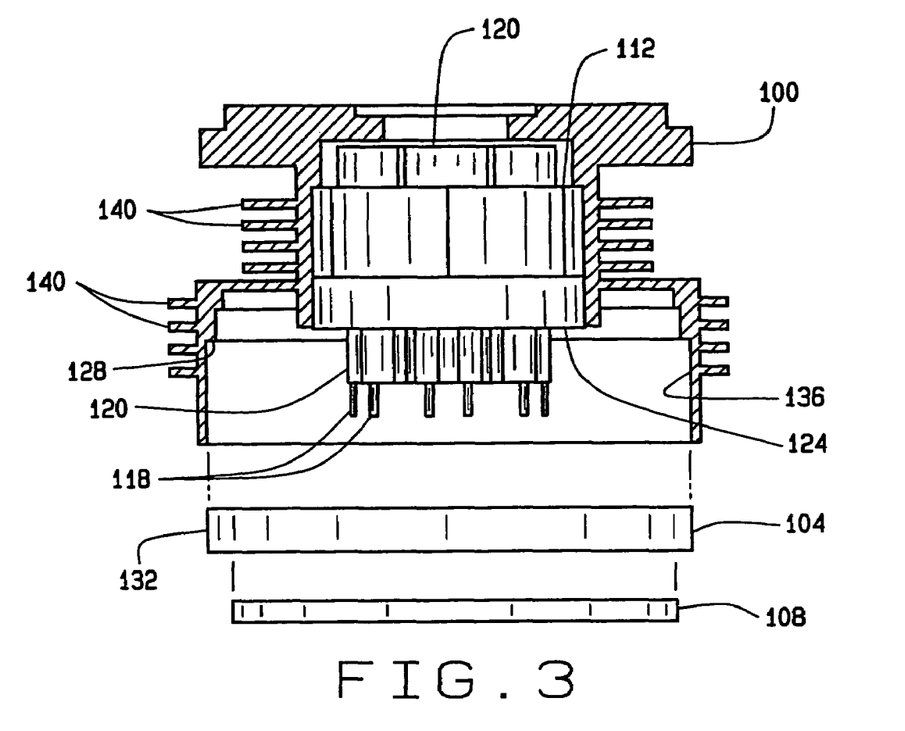
FIG. 3 is an exploded view showing the electronics mount and power and control electronics aligned for positioning within the housing (cross-section) shown in FIG. 1 and also showing a segmented stator and end shield within the housing.

The housing 100 can also include one or more external fins 140 for increased heat dissipation from the housing 100. In the illustrated embodiment, the housing 100 includes eight fins 140 each circumferentially disposed entirely around the housing 100. These fins 140 serve to increase the surface area from which heat can be dissipated from the housing 100. As shown in FIG. 3, the housing 100 includes four upper fins 140 adjacent the stator 112, and four lower fins 140 adjacent the mount 104 and electronics assembly 108. Accordingly, the housing 100 thus includes fins 140 for both the electronics assembly 108 and the other machine components like the stator 112, the end shield 124, and a rotor (not shown).

In various implementations, the fins 140 can be arranged to optimize heat dissipation from the housing 100 for air flow in a single direction that is generally perpendicular to the axis of rotation of the rotor assembly. For example, the housing 100 can be subject to forced convention. The preferred airstream velocity can be dependent on the cooling demands of the particular application.

Alternative implementations, however, can include a housing with more or less than eight fins and/or fins that do not circumferentially extend completely around the housing.

To further help with thermal management, the end shield 124 can also be coupled to the housing 100 by an interference fit formed between a sidewall of the end shield 124 and an inner surface of the housing 100. This interference fit can help maintain good thermal conductivity between the housing 100 and the end shield 124. The end shield 124 is also preferably formed of one or more materials (e.g., aluminum, aluminum alloy, etc.) having good thermal conductivity properties so that heat can be relatively efficiently transferred from the end shield 124 to the housing 100.

A description will now be provided of an exemplary method for forming the interference fit between the end shield 124 and the housing 100. First, the housing 100 can be heated (e.g., induction heated, etc.) to thermally expand the housing 100. The end shield 124 and/or housing 100 can then be moved relative to one another so as to position the end shield 124 within the thermally expanded housing 100. That is, the end shield 124 can be moved towards the housing 100 as the housing 100 remains stationary, or the housing 100 can be moved towards the end shield 124 as the end shield 124 remains stationary, or both the end shield 124 and the housing 100 can be moved towards each other. The housing 100 is allowed to cool and thermally contract against a sidewall of the end shield 124, thereby forming an interference fit between the housing 100 and the end shield 124. Allowing the housing 100 to cool can include either or both passively allowing the housing 100 to cool and/or actively cooling the housing 100.

Alternatively, other implementations can form the interference fit by actively cooling the end shield to thermally contract the end shield, moving the end shield and/or housing relative to one another so as to position the thermally contracted end shield within the housing, and allowing the end shield to thermally expand against the housing (e.g., by actively heating and/or passively allowing the end shield to return to ambient temperate). In further implementations, the interference fit between the housing and the end shield can be formed by using other suitable methods.

Figure 4:
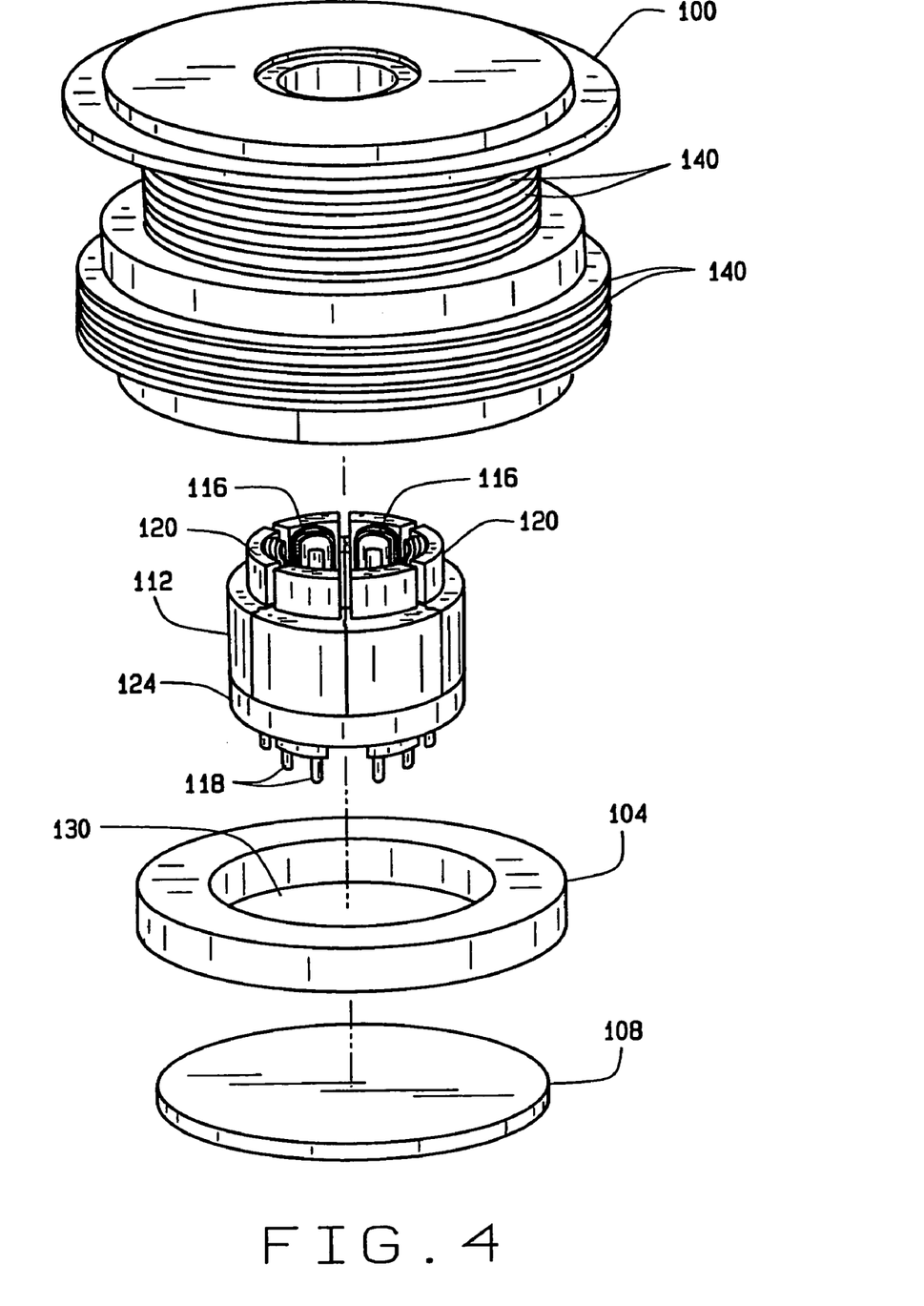
FIG. 4 is an exploded perspective view showing the electronics mount, power and control electronics, segmented stator, and end shield aligned for positioning within the housing (cross-section) shown in FIG. 3.
Figure 5:
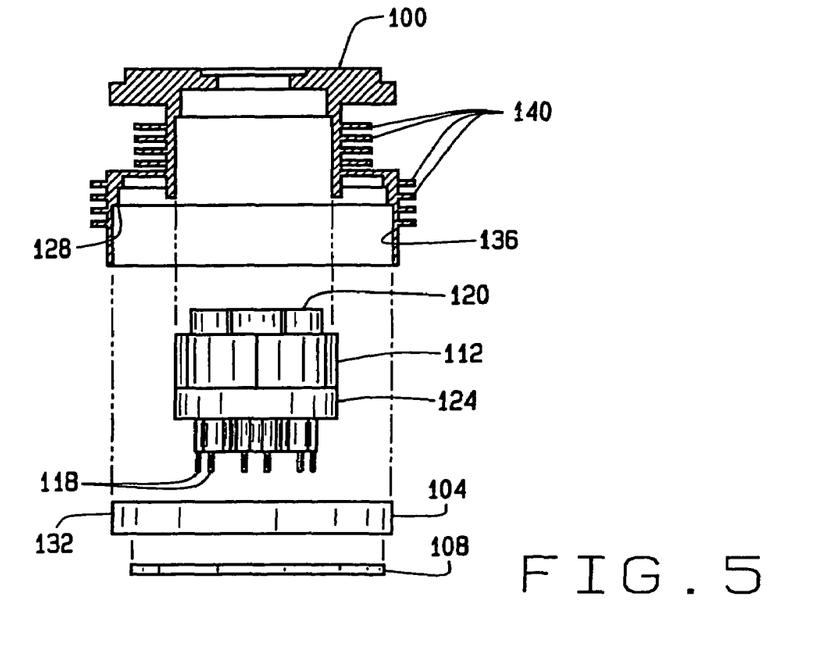
FIG. 5 is an exploded view showing the electronics mount, power and control electronics, segmented stator, and end shield aligned for positioning within the housing (cross-section) shown in FIG. 4.
Figure 6:
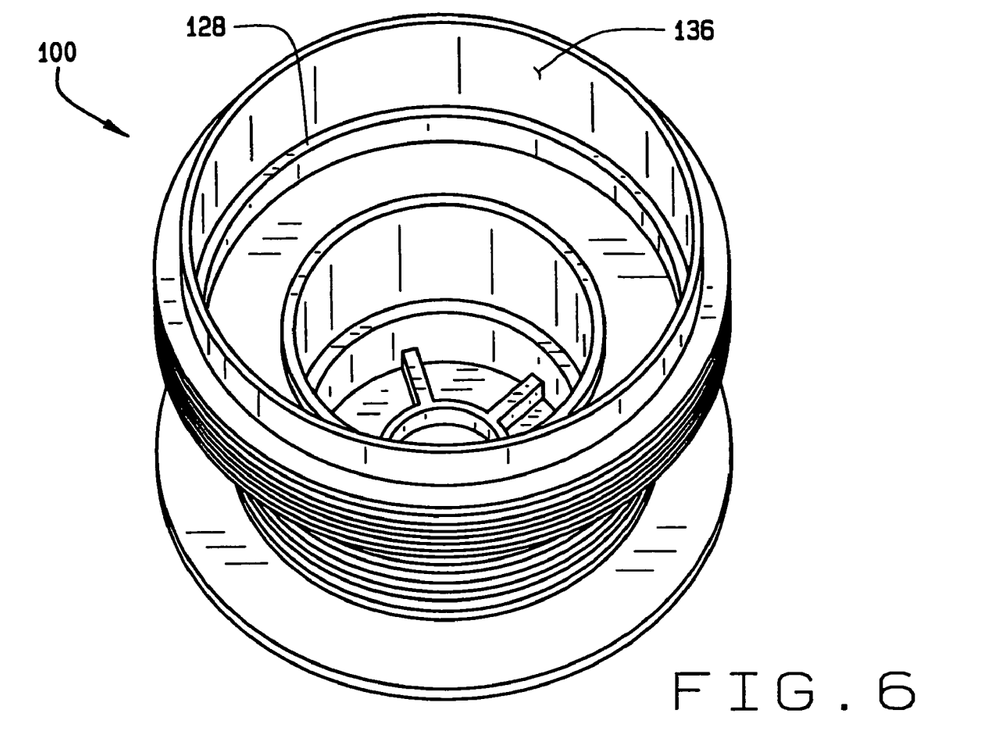
FIG. 6 is an inner perspective view of the housing shown in FIG. 1.
Figure 7:
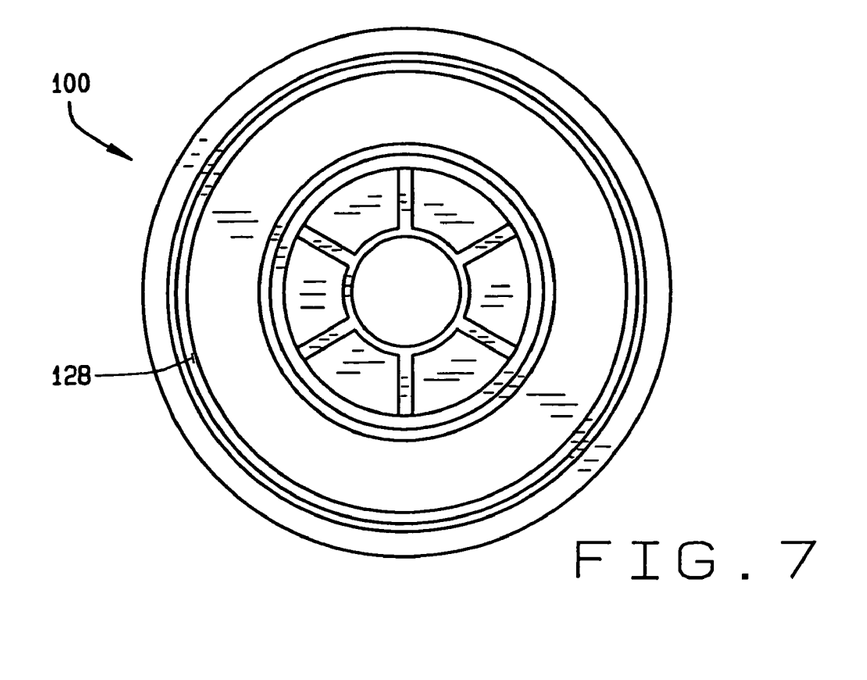
FIG. 7 is an inner view of the housing shown in FIG. 6.
Figure 8:
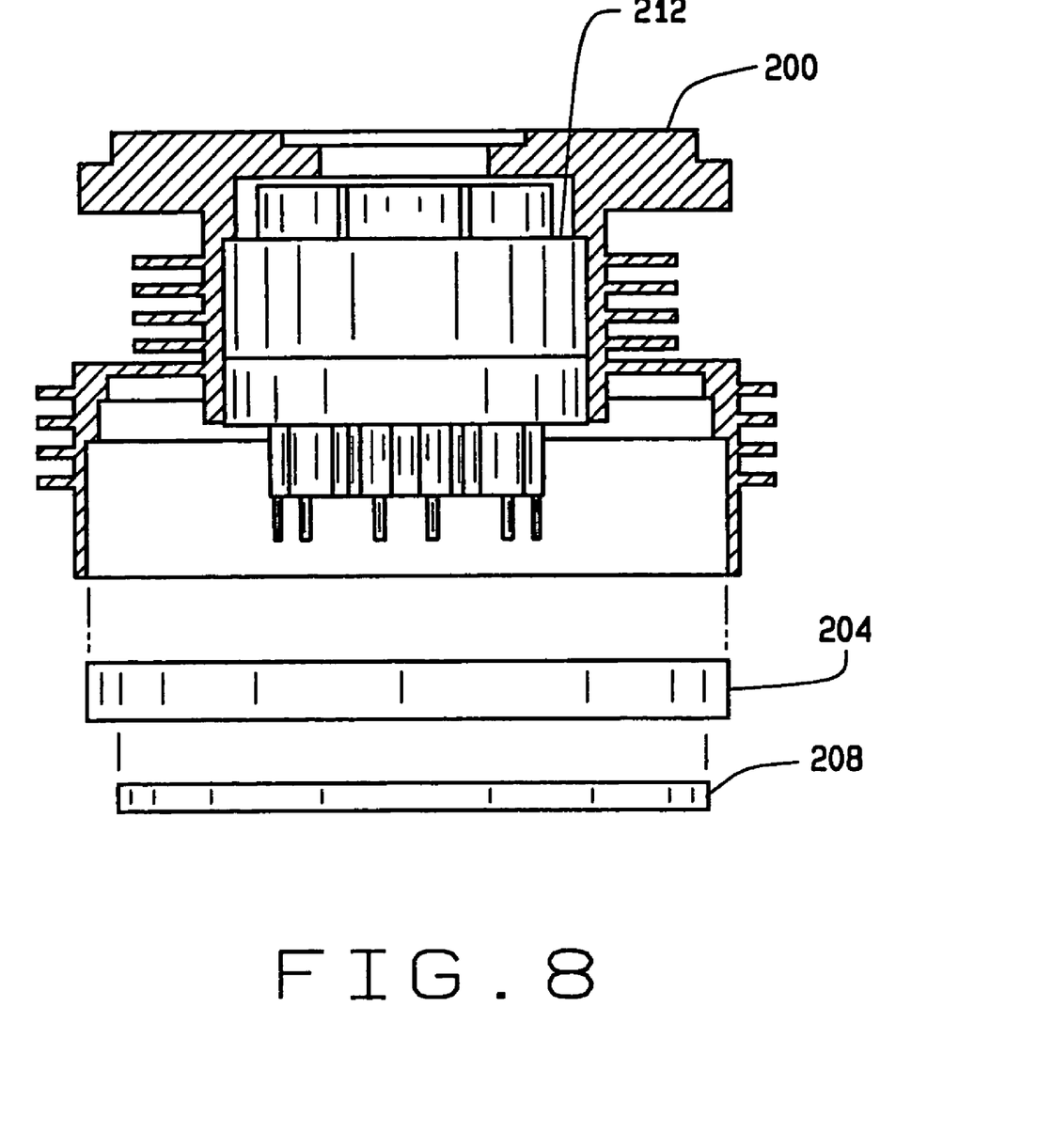
FIG. 8 is an exploded view of an electronics mount and power and control electronics aligned for positioning within a housing (cross-section) and also showing a non-segmented stator and end shield within the housing according to an exemplary embodiment of the invention.

FIGS. 3 through 5 show the circumferentially segmented stator 112 having six stator segments. Alternative embodiments, however, can include segmented stators having more or less than six stator segments depending on the particular application. Indeed, some embodiments include a non-segmented or full round stator. For example, FIG. 8 illustrates an exemplary housing 200, a mount 204, and power and control electronics assembly 208 being used in conjunction with a non-segmented stator 212.

In another form, the present invention provides a method that generally includes heating a housing of an electric machine to thermally expand the housing, positioning within the housing a mount for power and control electronics, and allowing the housing to cool and thermally contract against the mount thereby forming an interference fit between the housing and the mount. The interference fit secures the mount within the housing and also can maintain good thermal conductivity between the housing and the mount. In addition, the mount can also operate as a heat sink for the power electronics coupled thereto.

The mount and the housing preferably have coefficients of thermal expansion such that the interference fit therebetween is maintained across an operating temperature range of the machine. For example, the mount preferably has a coefficient of thermal expansion about equal to or greater than the housing's coefficient of thermal expansion.

The method can also include mounting power and control electronics to the mount either before, after, or as the mount is being positioned within the housing. In various implementations, positioning the mount within the housing can include abutting the mount against an internal stop defined within the housing. The method can further include positioning a segmented or non-segmented stator within the housing.

Accordingly, various implementations enable power and control electronics to be positioned within the same primary housing as other machine components, such as the stator, stator windings, end shield, and rotor. This, in turn, can significantly improve the manufacturability of electric machines. By eliminating the need to separately package the machine from its power and control electronics, manufacture and assembly can be streamlined with reductions in the number of discrete components, fasteners, material, and tooling.

Various aspects of the present invention can be used in a wide range of electric machines, electric motors, electric superchargers, switched reluctance motors, brushless permanent magnet (BPM) motors, and induction motors. Accordingly, the specific references to electric machine herein should not be construed as limiting the scope of the present invention to only one specific form/type of electric machine.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method comprising heating a housing of an electric machine to thermally expand the housing, positioning a mount having power and control electronics assembled thereon and in contact therewith in the housing and against an internal stop defined within the housing, and allowing the housing to cool and thermally contract against the mount thereby forming an interference fit between the housing and the mount, the interference fit securing the mount within the housing, wherein the mount and the housing have coefficients of thermal expansion such that the interference fit is maintained across an operating temperature range of the machine.

2. The method of claim 1, wherein the mount has a coefficient of thermal expansion about equal to or greater than the housing's coefficient of thermal expansion.

3. The method of claim 1, further comprising mounting power and control electronics to the mount before positioning the mount within the housing.

4. The method of claim 1, wherein the interference fit between the housing and the mount maintains thermal conductivity between the housing and the mount.

5. The method of claim 1, wherein the mount operates as a heat sink for electronics coupled thereto.

6. The method of claim 1, further comprising positioning a stator within the housing.

* * * * *

UNITED STATES PATENT AND TRADEMARK OFFICE
CERTIFICATE OF CORRECTION

| | | |
|---|---|---|
| PATENT NO. | : 7,581,307 B2 | Page 1 of 1 |
| APPLICATION NO. | : 11/208687 | |
| DATED | : September 1, 2009 | |
| INVENTOR(S) | : Stewart et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 288 days.

Signed and Sealed this

Fourteenth Day of September, 2010

David J. Kappos
*Director of the United States Patent and Trademark Office*